(12) United States Patent
Tsuyuki et al.

(10) Patent No.: US 12,528,446 B2
(45) Date of Patent: Jan. 20, 2026

(54) HYBRID VEHICLE CONTROL METHOD AND HYBRID VEHICLE CONTROL DEVICE

(71) Applicant: NISSAN MOTOR CO., LTD., Yokohama (JP)

(72) Inventors: Takeshi Tsuyuki, Kanagawa (JP); Akio Ashikaga, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 249 days.

(21) Appl. No.: 18/562,186

(22) PCT Filed: May 19, 2021

(86) PCT No.: PCT/JP2021/018934
§ 371 (c)(1),
(2) Date: Nov. 17, 2023

(87) PCT Pub. No.: WO2022/244132
PCT Pub. Date: Nov. 24, 2022

(65) Prior Publication Data
US 2025/0222919 A1 Jul. 10, 2025

(51) Int. Cl.
*B60W 20/16* (2016.01)
*B60K 6/26* (2007.10)
(Continued)

(52) U.S. Cl.
CPC .............. *B60W 20/16* (2016.01); *B60K 6/26* (2013.01); *B60K 6/40* (2013.01); *F02P 5/1504* (2013.01);
(Continued)

(58) Field of Classification Search
CPC .. B60W 20/16; B60K 6/26; B60K 6/40; F02P 5/1504
See application file for complete search history.

(56) References Cited

U.S. PATENT DOCUMENTS 6,568,177 B1 * 5/2003 Surnilla .............. F02D 41/0087
123/481
12,085,034 B2 * 9/2024 Anzawa .................... F02P 5/15
(Continued)

FOREIGN PATENT DOCUMENTS

| JP | 2010-185433 A | 8/2010 |
| JP | 2014-094691 A | 5/2014 |

(Continued)

*Primary Examiner* — Kevin A Lathers
(74) *Attorney, Agent, or Firm* — Foley & Lardner LLP

(57) ABSTRACT

A hybrid vehicle includes a generator capable of generating and supplying power to a battery; a drive motor that drives driving wheels of the hybrid vehicle with power supplied from the battery or power generated by the generator, an internal combustion engine that drives the generator; and a first exhaust purification device for exhaust purification arranged in an exhaust passage of the internal combustion engine. The hybrid vehicle is configured to perform catalyst temperature rise control to retard an ignition timing of the internal combustion engine when a temperature of the first exhaust purification device is lower than or equal to a predetermined temperature level. In the catalyst temperature rise control, a retardation amount of the ignition timing in a state where the hybrid vehicle experiences more vibration than in a stop state of the hybrid vehicle is set larger than that in the stop state of the hybrid vehicle.

5 Claims, 6 Drawing Sheets

(51) Int. Cl.
  *B60K 6/40* (2007.10)
  *F02P 5/15* (2006.01)
(52) U.S. Cl.
  CPC ... *B60W 2510/068* (2013.01); *B60W 2520/10* (2013.01); *B60W 2710/06* (2013.01); *B60W 2710/0694* (2013.01); *B60Y 2200/92* (2013.01)

(56) References Cited

U.S. PATENT DOCUMENTS

2017/0260921 A1    9/2017  Ueno et al.
2020/0010089 A1    1/2020  Ford et al.
2023/0347863 A1*  11/2023  Idogawa ................... F01N 3/20

FOREIGN PATENT DOCUMENTS

| JP | 2015-010590 A | 1/2015 |
| JP | 2016-112918 A | 6/2016 |
| JP | 2016-159878 A | 9/2016 |
| JP | 2017-166353 A | 9/2017 |

* cited by examiner

HYBRID VEHICLE CONTROL METHOD AND HYBRID VEHICLE CONTROL DEVICE

TECHNICAL FIELD

The present invention relates to a control method for a hybrid vehicle and a control device for a hybrid vehicle.

BACKGROUND ART

Patent Document 1 discloses a technique of retarding the ignition timing of an internal combustion engine mounted on a hybrid vehicle in order to warm up a catalyst for purifying exhaust gas of the internal combustion engine.

The internal combustion engine deteriorates in combustion stability with retardation of the ignition timing. The deterioration of the combustion stability leads to large vibration of the internal combustion engine. For this reason, the ignition timing retardation amount of the internal combustion engine is naturally limited in view of the combustion stability even though the retardation of the ignition timing is intended for warm-up of the catalyst.

In the case where vibration of the internal combustion engine is mixed in and hidden under vibration of the vehicle, however, it is possible to perform early warm-up of the catalyst preferentially over the combustion stability of the internal combustion engine without causing driver's discomfort.

Accordingly, there is room for further improvement in the setting of the ignition timing retardation amount of the internal combustion engine for catalyst warm-up control.

PRIOR ART DOCUMENTS

Patent Documents

Patent Document 1: Japanese Laid-Open Patent Publication No. 2014-94691

SUMMARY OF THE INVENTION

The present invention is directed to a hybrid vehicle that performs catalyst temperature rise control to retard the ignition timing of an internal combustion engine when the temperature of an exhaust purification catalyst disposed in an exhaust passage of the internal combustion engine is lower than or equal to a predetermined temperature level, wherein, in the catalyst temperature rise control, the amount of retardation of the ignition timing in a state where the hybrid vehicle experiences more vibration than in a stop state of the hybrid vehicle is set larger than the amount of retardation of the ignition timing in the stop state of the hybrid vehicle.

The hybrid vehicle according to the present invention achieves catalyst warm-up as early as possible without causing driver's discomfort.

DESCRIPTION OF EMBODIMENTS

Hereinafter, one embodiment of the present invention will be described in detail below with reference to the drawings.

Figure 1:
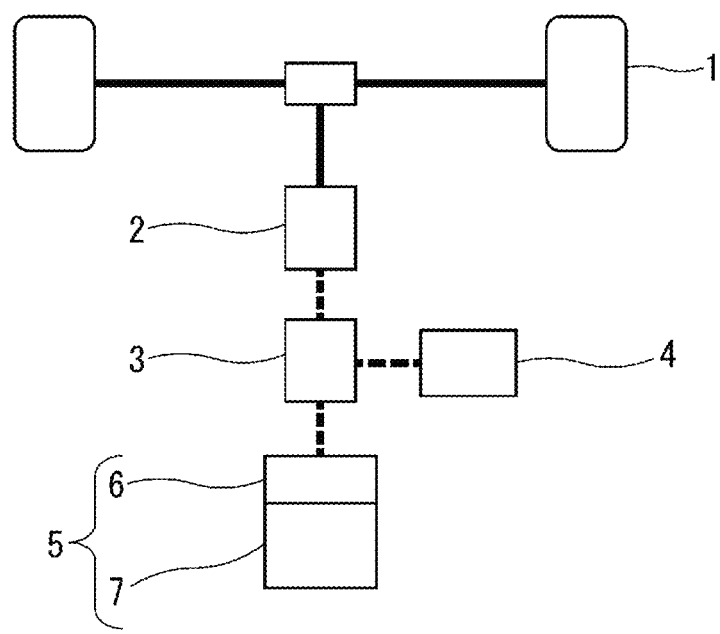
FIG. 1 is a schematic system configuration diagram of a hybrid vehicle to which the present invention is applicable.

FIG. 1 is a schematic diagram showing the system configuration of a hybrid vehicle to which the present invention is applicable.

The hybrid vehicle includes: vehicle driving wheels 1; a drive motor 2 which rotatively drives the driving wheels 1; an inverter 3 which feeds alternating-current power to the drive motor 2; and a battery 4 and a power generation unit 5 each of which provides power supply to the inverter 3.

The driving wheels 1 are rotatively driven under the action of the drive motor 2 as a drive source.

The drive motor 2 corresponds to a second motor. For example, the drive motor 2 is in the form of a synchronous motor having a permanent motor mounted on a rotor.

The drive motor 2 is a drive source of the hybrid vehicle, and is driven with alternating-current power fed from the inverter 3. The drive motor 2 also functions as a generator during deceleration of the hybrid vehicle. More specifically, the drive motor 2 has the function of generating regenerative energy as power to charge the battery 4 via the inverter 3 during deceleration of the hybrid vehicle.

The inverter 3 is a power conversion circuit for converting power generated by the power generation unit 5 or the drive motor 2 to direct-current power and feeding the direct-current power to the battery 4. The inverter 3 is also a power conversion circuit for converting direct-current power outputted from the battery 4 to alternating-current power and feeding the alternating-current power to the drive motor 2.

The battery 4 is in the form of a secondary battery chargeable with direct-current power converted from power generated by the power generation unit 5 or the drive motor 2. The battery 4 supplies the charged power to the drive motor 2 via the inverter 3.

The power generation unit 5 has a generator 6 as a generator motor and a power-generating internal combustion engine 7 that drives the generator 6.

In other words, in the hybrid vehicle to which the present invention is applicable, the internal combustion engine 7 is operated to drive the generator 7.

The power generation unit 5 is capable of operation (starting or stopping) independently of the drive motor 2.

The generator 6 is in the form of, for example, a synchronous motor having a permanent motor mounted on a rotor. The generator 6 corresponds to a first motor, and is operated to convert rotational energy generated by the internal combustion engine 7 to electric energy and supply the electric energy to the battery 4 or the drive motor 2 via the inverter 3. The generator 6 also functions as a starter motor during starting of the internal combustion engine 7.

In the case where the hybrid vehicle is driven while performing power generation, the drive motor 2 is driven with power generated by the generator 6; and the residual power is charged into the battery 4. In the case where the hybrid vehicle is driven while performing catalyst temperature rise control, the drive motor 2 is driven with power generated by the generator 6 and power supplied from the battery 4.

Figure 2:
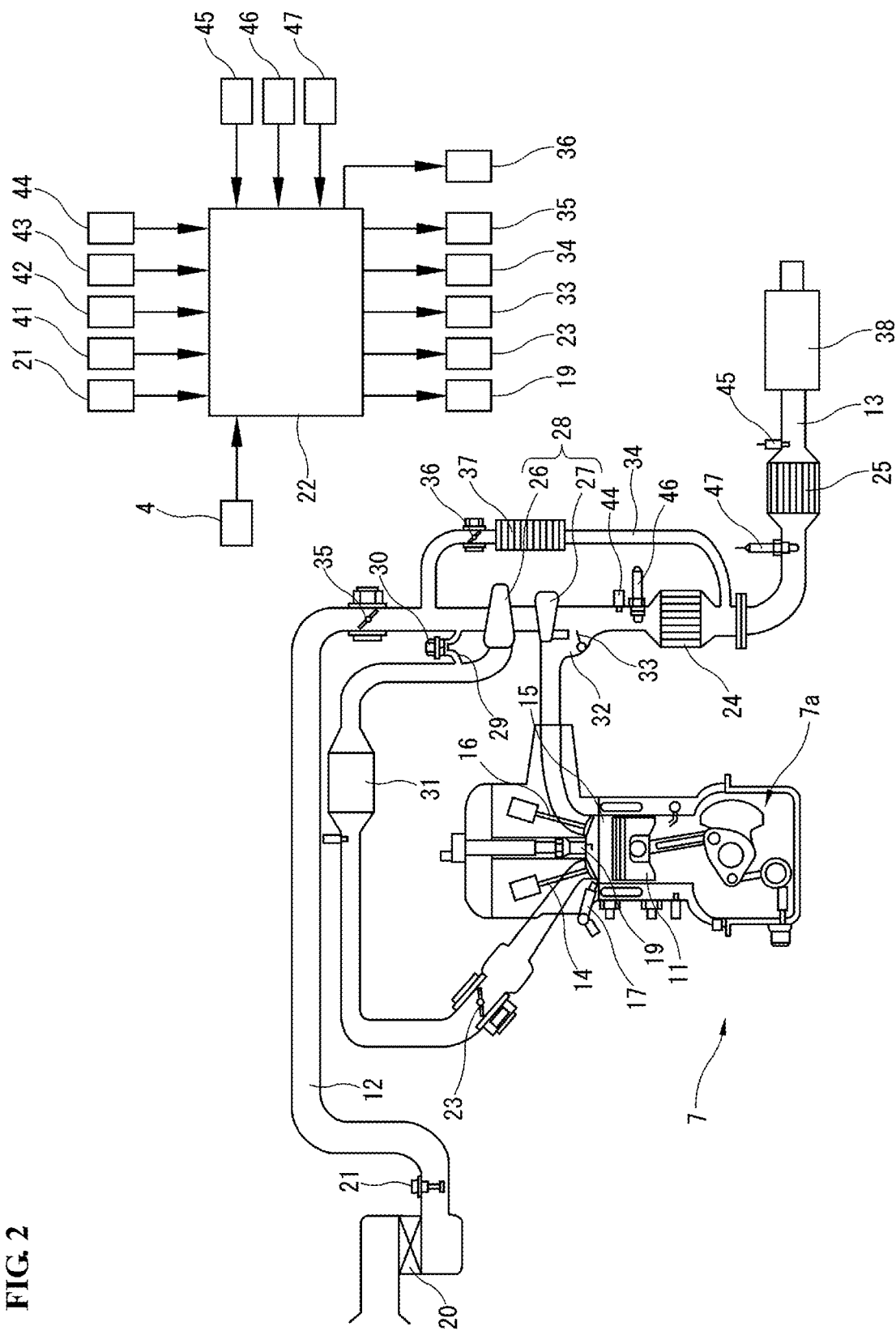
FIG. 2 is a schematic system configuration diagram of an internal combustion engine 7 mounted to the hybrid vehicle to which the present invention is applicable.

FIG. 2 is a schematic view showing the system configuration of the internal combustion engine 7 mounted to the hybrid vehicle to which the present invention is applicable.

The internal combustion engine 7 is a so-called reciprocating type internal combustion engine that converts reciprocating motion of pistons 11 to rotation of a crank shaft (not shown) and outputs the thus-obtained rotational force as drive power. The internal combustion engine 7 may be started by a dedicated starter motor different from the generator 6. In the present embodiment, the internal combustion engine 7 is equipped with a multi-link piston-crank mechanism 7a capable of changing a mechanical compression ratio.

An intake passage 12 and an exhaust passage 13 are provided in the internal combustion engine 7. The intake passage 12 is connected to a combustion chamber 15 via an intake valve 14, whereas the exhaust passage 13 is connected to the combustion chamber 15 via an exhaust valve 16.

The internal combustion engine 7 has a fuel injection valve 17 that directly injects fuel (gasoline) into the combustion chamber 15. The fuel injected from the fuel injection valve 17 is ignited by an ignition plug 19 within the combustion chamber 15. The internal combustion engine 7 may alternatively be configured to inject fuel into an intake port of each cylinder.

In the intake passage 12, there are provided: an air cleaner 20 that collects a foreign substance in intake air; an air flow meter 21 that detects the amount of intake air; and an electrically-operable throttle valve 23 that has an opening controlled under a control signal from a control unit 22.

The air flow meter 21 is located upstream of the throttle valve 23. The air flow meter 21 is equipped with a built-in temperature sensor so as to detect the temperature of intake air flowing through an intake introduction port. The air cleaner 20 is located upstream of the air flow meter 21.

In the exhaust passage 13, there are provided exhaust catalyst devices 24 and 25 with three-way catalysts etc. as catalysts for purification of exhaust gas. The first exhaust catalyst device 24 is a so-called manifold catalyst and is located most upstream among the exhaust gas purification catalysts in the exhaust passage 13. The second exhaust catalyst device 25 is a so-called underfloor catalyst and is located downstream of the first exhaust catalyst device 24.

The internal combustion engine 7 also has an exhaust turbine supercharger (turbosupercharger) 28 including a compressor 26 disposed in the intake passage 12 and an exhaust turbine 27 disposed in the exhaust passage 13 such that the compressor and the exhaust turbine are coaxial with each other. The compressor 26 is located upstream of the throttle valve 23 and downstream of the air flow meter 21, whereas the exhaust turbine 27 is located upstream of the first exhaust catalyst device 24.

A recirculation passage 29 is connected to the intake passage 12. More specifically, one end of the recirculation passage 29 is connected to the intake passage 12 at a position upstream of the compressor 26; and the other end of the recirculation passage 29 is connected to the intake passage 12 at a position downstream of the compressor 26. In the recirculation passage 29, an electrically-operable recirculation valve 30 is disposed so as to release boost pressure from the downstream side of the compressor 26 to the upstream side of the compressor 26. As the recirculation valve 30, there can be used a so-called check valve capable of being opened only when the pressure at the downstream side of the compressor 26 becomes higher than or equal to a predetermined pressure level.

Further, an intercooler 31 is disposed in the intake passage 12 at a position downstream of the compressor 26 so as to cool intake air compressed (pressurized) by the compressor 26 for improvement in charging efficiency. The intercooler 31 is located downstream of the downstream-side end of the recirculation passage 29 and upstream of the throttle valve 23.

An exhaust bypass passage 32 is connected to the exhaust passage 13 so as to bypass the exhaust turbine 27 and establish a connection between the upstream and downstream sides of the exhaust turbine 27. A downstream-side end of the exhaust bypass passage 32 is connected to the exhaust passage 13 at a position upstream of the first exhaust catalyst device 24. An electrically-operable waste gate valve 33 is disposed in the exhaust bypass passage 32 so as to control the amount of exhaust gas flowing in the exhaust bypass passage 32. The waste gate valve 33 is capable of allowing a part of exhaust gas introduced to the exhaust turbine 27 to bypass to the downstream side of the exhaust turbine 27, thereby controlling the boost pressure of the internal combustion engine 7.

Furthermore, the internal combustion engine 7 is of the type capable of performing exhaust gas recirculation (EGR) to introduce (recirculate) a part of exhaust gas as EGR gas from the exhaust passage 13 into the intake passage 12. An EGR passage 34 is branched from the exhaust passage 13 and connected to the intake passage 12. More specifically, one end of the EGR passage 34 is connected to the exhaust passage 13 at a position between the first exhaust catalyst device 24 and the second exhaust catalyst device 25; and the other end of the EGR passage 34 is connected to the intake passage 12 at a position downstream of a second throttle valve 35 and upstream of the compressor 26. In the EGR passage 34, there are provided an electrically-operable EGR valve 36 that adjusts (controls) the amount of EGR gas flowing in the EGR passage 34 and an EGR cooler 37 that cools the EGR gas.

The second throttle valve 35 is disposed in the intake passage 12 at a position between the air flow meter 21 and the compressor 26. The second throttle valve 35 controls the pressure of intake air at the upstream side of the compressor 26.

In FIG. 2, reference numeral 28 designates a nozzle muffler located downstream of the second exhaust catalyst device 25 so as to reduce exhaust sound.

The control unit 22 is in the form of a known digital computer equipped with a CPU, a ROM, a RAM and an input/output interface.

The control unit 22 receives not only a detection signal from the air flow meter 21 but also detection signals from various other sensors such as: a vehicle speed sensor 41 that detects a running speed of the hybrid vehicle; a crank angle sensor 42 that detects a crank angle of a crankshaft; an accelerator opening sensor 43 that detects a depression amount of an accelerator pedal; a first exhaust temperature sensor 44 that detects an exhaust temperature at an inlet side of the first exhaust catalyst device 24; a second exhaust temperature sensor 45 that detects an exhaust temperature at an outlet side of the second exhaust catalyst device 25; and an A/F sensor 46 and an oxygen sensor 47 that detect an air-fuel ratio.

The vehicle speed sensor 41 corresponds to a vehicle speed detection part.

The crank angle sensor 42 is of the type capable of detecting an engine rotation speed of the internal combustion engine 7.

The accelerator opening sensor 43 is of the type capable of detecting, in addition to an accelerator opening as an operation amount of the accelerator pedal, an accelerator change speed as an operation speed of the accelerator pedal. In other words, the accelerator opening sensor 43 corresponds to an accelerator operation amount detection part.

The A/F sensor 46 is in the form of a so-called wide-range air-fuel ratio sensor having a nearly linear output characteristic in accordance with the air-fuel ratio of exhaust gas and is disposed in the exhaust passage 13 at a position upstream of the first exhaust catalyst device 24. More specifically, the A/F sensor 46 is located upstream of the first exhaust catalyst device 24 and downstream of the downstream-side end of the exhaust bypass passage 32.

The oxygen sensor 47 is a sensor whose output voltage changes in an ON/OFF manner (i.e. switches between a rich level and a lean level) so as to detect only whether the air-fuel ratio is rich or lean. The oxygen sensor 47 is disposed in the exhaust passage 13 at a position downstream of the first exhaust catalyst device 24.

Based on the detection signals from the various sensors, the control unit 22 optimally controls the amount and timing of injection of fuel from the fuel injection valve 17, the ignition timing of the internal combustion engine 7 (ignition plug 19), the intake air amount of the internal combustion engine and the like. The control unit 22 determines the demanded load of the internal combustion engine 7 (also simply referred to as load of the internal combustion engine 7) based on the detection signal of the accelerator opening 20) sensor 43. Furthermore, the control unit 22 determines the SOC (State Of Charge) as the ratio of the remaining charge to the charge capacity of the battery 4.

As mentioned above, the hybrid vehicle is embodied as a so-called series hybrid vehicle which runs by driving the driving motor 2 with power from the generator 6 driven by the internal combustion engine 7 or with power from the battery 4. In the series hybrid vehicle, the internal combustion engine 7 is driven to charge the battery 4 when the SOC of the battery 4 becomes low. During running of the series hybrid vehicle, the internal combustion engine 7 having been driven to charge the battery 4 is stopped upon satisfaction of a predetermined condition, such as that the SOC of the battery 4 becomes higher than or equal to a predetermined value.

In the present embodiment, the hybrid vehicle is configured to perform catalyst temperature rise control so as to control the catalyst of the first exhaust catalyst device 24 to an activation temperature in the case where the catalyst temperature of the first exhaust catalyst device 24 is lower than or equal to a predetermined temperature level at starting of the internal combustion engine 7.

The catalyst temperature of the first exhaust catalyst device 24 can be determined by the control unit 22 based on e.g. the detection value of the first exhaust temperature sensor 44. Alternatively, the catalyst temperature of the first exhaust catalyst device 24 may be directly detected by a temperature sensor or may be estimated from the engine operation conditions (the operation conditions of the internal combustion engine 7).

Under the catalyst temperature rise control, the ignition timing of the internal combustion engine 7 is more retarded than that when the catalyst temperature of the 10) exhaust catalyst device 24 is higher than the predetermined temperature level.

The catalyst temperature rise control is performed in such a manner that the retardation amount of the ignition timing in a state where the hybrid vehicle experiences more vibration than in a stop state of the hybrid vehicle is set larger than the retardation amount of the ignition timing in the stop state of the hybrid vehicle. The state where the hybrid vehicle experiences more vibration than in the stop state of the hybrid vehicle is, for example, a running state of the hybrid vehicle.

In the catalyst temperature rise control during e.g. running of the vehicle, the ignition timing retardation amount of the internal combustion engine 7 is set larger as the vehicle speed becomes higher.

More specifically, the ignition timing retardation amount under the catalyst temperature rise control is calculated using a first ignition timing retardation amount calculation map for calculating a first ignition timing retardation amount which corresponds to the retardation amount of the ignition timing in the stop state of the vehicle, a second ignition timing retardation amount calculation map for calculating a second ignition timing retardation amount which corresponds to the retardation amount of the ignition timing in the running state of the vehicle, and a ratio set according to the vehicle speed.

In the present embodiment, the control unit 22 as a controller determines the ignition timing of the internal combustion engine 7 with the sum of a value of the first ignition timing retardation amount multiplied by a first ratio set according to the vehicle speed and a value of the second ignition timing retardation amount multiplied by a second ratio set according the vehicle speed being set as a catalyst temperature rise control retardation amount for catalyst temperature rise control. Thus, the control unit 22 corresponds to a controller that retards the ignition timing of the internal combustion engine 7 when the catalyst temperature of the first exhaust catalyst device 24 is lower than or equal to the predetermined temperature level.

Figure 3:
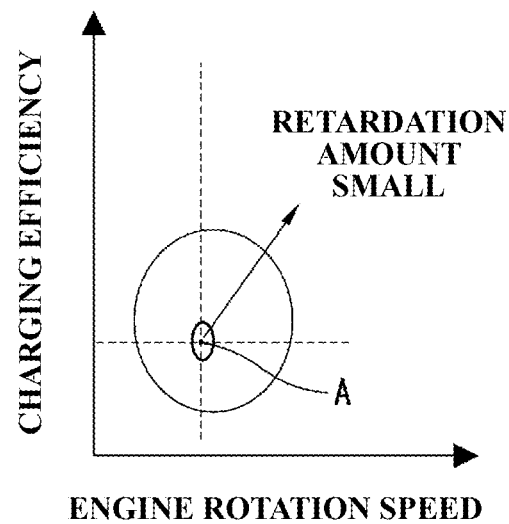
FIG. 3 is a first ignition timing retardation amount calculation map for calculating a first ignition timing retardation amount.

FIG. 3 is a diagram of the first ignition timing retardation amount calculation map. The first ignition timing retardation amount is calculated depending on an operation point of the internal combustion engine 7 which is defined by the charging efficiency of the internal combustion engine 7 and the engine rotation speed of the internal combustion engine 7. Herein, the charging efficiency is determined by the control unit 22 based on e.g. the detection value of the air flow meter 21.

When catalyst warm-up is performed (that is, the catalyst temperature of the exhaust catalyst device 24 is lower than or equal to the predetermined temperature level), the internal combustion engine 7 is operated at an operation point A for catalyst warm-up. In the first ignition timing retardation amount calculation map, the first ignition timing retardation amount is set smaller as the operation point of the internal combustion engine 7 becomes further away from the operation point A.

The internal combustion engine 7 is operated at an operation point for normal power generation (not shown), which is different from the operation point A, when there is no need to perform catalyst warm-up (i.e. the catalyst temperature of the exhaust catalyst device 24 is higher than the predetermined temperature level). The operation point for normal power generation is an operation point at which the operation efficiency is optimal. By contrast, the operation point A is an operation point at which e.g. the gas volume is less and the exhaust temperature is easy to rise.

The engine rotation speed and load are lower at the operation point A than at the operation point for normal power generation.

Figure 4:
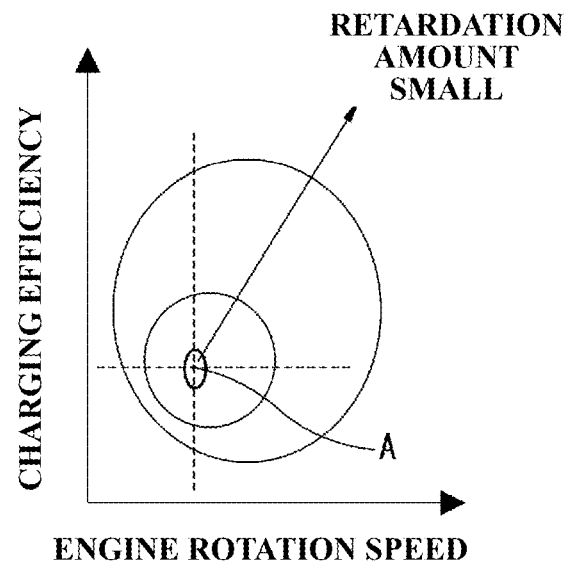
FIG. 4 is a second ignition timing retardation amount calculation map for calculating a second ignition timing retardation amount.

FIG. 4 is a diagram of the second ignition timing retardation amount calculation map. The second ignition timing retardation amount is also determined depending on an operation point of the internal combustion engine 7 which is defined by the charging efficiency of the internal combustion engine 7 and the engine rotation speed of the internal combustion engine 7. In the second ignition timing retardation amount calculation map, the second ignition timing retardation amount is set smaller as the operation point of the internal combustion engine 7 becomes further away from the operating point A.

Figure 5:
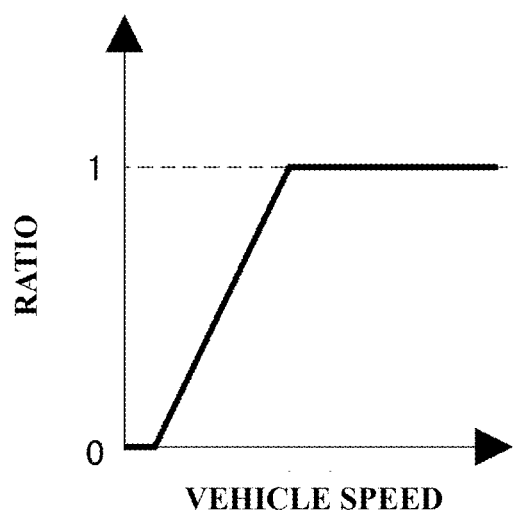
FIG. 5 is a ratio calculation map for calculating a vehicle speed-dependent ratio.

The ratio set according to the vehicle speed is calculated using a ratio calculation map of FIG. 5. More specifically, the ratio calculated using the ratio calculation map of FIG. 5 is the second ratio by which the second ignition timing retardation amount is to be multiplied. The second ratio is a value smaller than or equal to "1". The first ratio by which the first ignition timing retardation amount is to be multiplied is a value obtained by subtracting the value of the second ratio from "1". Accordingly, the sum of the first ratio and the second ratio is "1".

The second ratio is "0" until the vehicle speed reaches a predetermined first vehicle speed level. The second ratio increases in proportion to the vehicle speed when the vehicle speed increases from the predetermined first vehicle speed level to a predetermined second vehicle speed level. When the vehicle speed reaches the second vehicle speed level, the second ratio becomes "1". The second ratio is "1" when the vehicle speed is higher than or equal to the second vehicle speed level.

The first ignition timing retardation amount calculation map, the second ignition timing retardation amount calculation map and the ratio calculation amount can be stored in advance in, for example, the ROM of the control unit 22.

Figure 6:
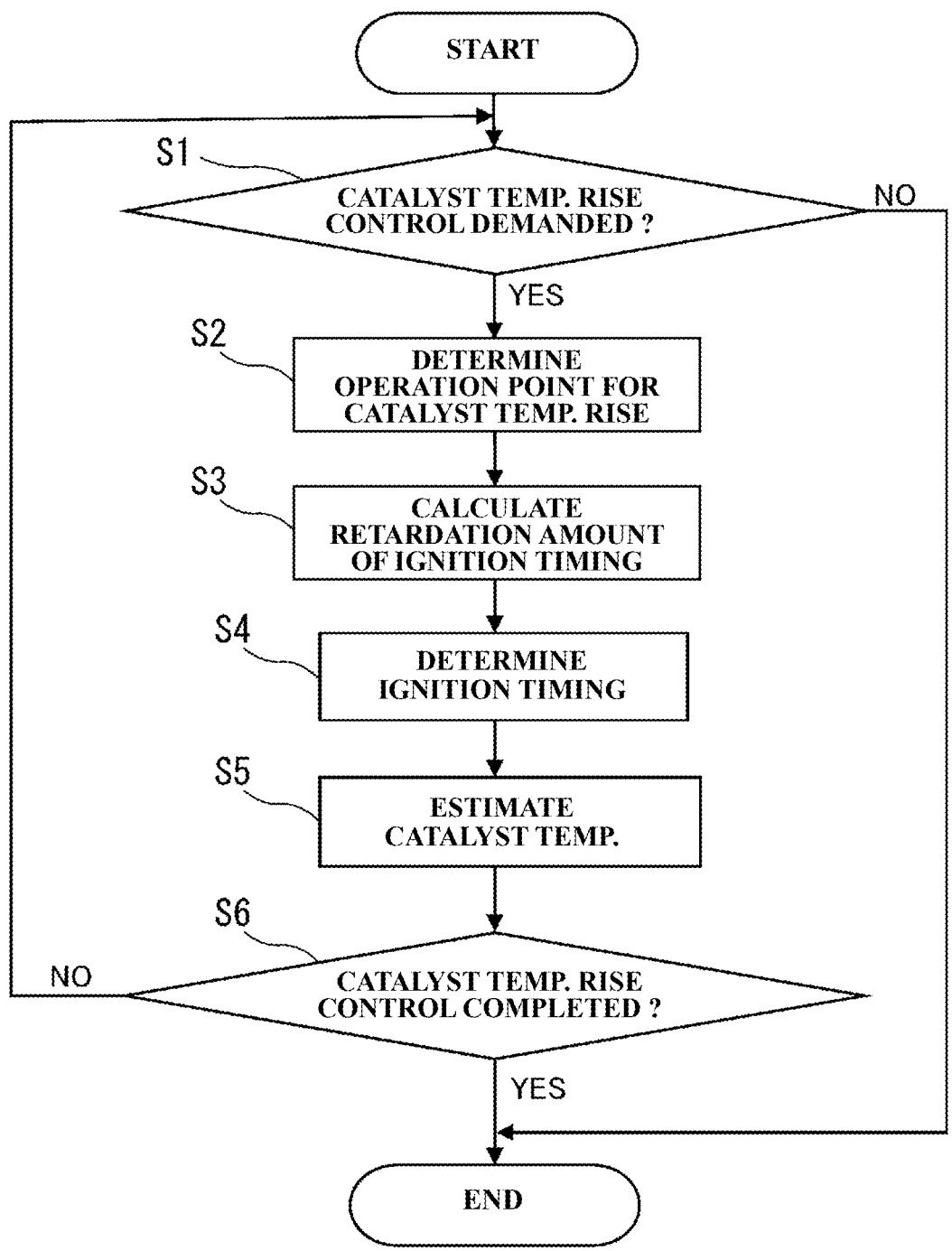
FIG. 6 is a flowchart of a process for catalyst temperature rise control in the hybrid vehicle.

FIG. 6 is a flowchart of a process for the catalyst temperature rise control of the hybrid vehicle according to the present embodiment. The catalyst temperature rise control is executed depending on the situation where the internal combustion engine 7 is started upon satisfaction of the predetermined condition after key-on. The internal combustion engine 7 is started in accordance with the SOC of the battery 4 and the vehicle speed.

At step S1, it is judged whether or not the catalyst temperature rise control is demanded. When the catalyst temperature of the first exhaust catalyst device 24 at starting of the internal combustion engine 7 is lower than or equal to the predetermined temperature level, the process proceeds to step S2 upon judging that the catalyst temperature rise control is demanded. In other words, it is judged at step S1 whether or not the first exhaust catalyst device 24 is in an activation state required for emission reduction. When the first exhaust catalyst device 24 is not in the activation state, the process shifts to the routine of the catalyst temperature rise control.

At step S2, the operation point of the internal combustion engine 7 under the catalyst temperature rise control is determined. More specifically, the operation point A for catalyst warm-up is determined as a catalyst temperature rise operation point at step S2.

At step S3, the retardation amount of the ignition timing of the internal combustion engine 1 under the catalyst temperature rise control is calculated according to the vehicle speed. As the vehicle speed becomes higher, vibration of the engine caused due to retardation of the ignition timing can be more readily hidden under vibration of the vehicle. Thus, the retardation amount of the ignition timing of the internal combustion engine 1 is set larger as the vehicle speed becomes higher.

At step S4, the ignition timing of the internal combustion engine 7 is determined. More specifically, the ignition timing of the internal combustion engine 7 is determined by retarding the MBT ignition timing by the ignition timing retardation amount calculated at step S3. In place of the MBT ignition timing, the most advanced ignition timing corresponding to the knock limit may be adopted as the standard ignition timing.

At step S5, the catalyst temperature of the first exhaust catalyst device 24 is estimated in consideration of the retardation amount of the ignition timing of the internal combustion engine 7. It is feasible to estimate the catalyst temperature of the first exhaust catalyst device 24 from, for example, the amount of heat supplied to the catalyst of the first exhaust catalyst device 24. When the retardation amount is large, the amount of heat supplied to the catalyst of the first exhaust catalyst device 24 is large so that the catalyst temperature of the first exhaust catalyst device 24 rises rapidly.

At step S6, it is judged whether or not the catalyst temperature rise control is completed. When the catalyst temperature estimated at step S5 is higher than the predetermined temperature level, the catalyst temperature rise control is completed upon judging that the catalyst of the first exhaust catalyst device 24 has been activated.

Figure 7:
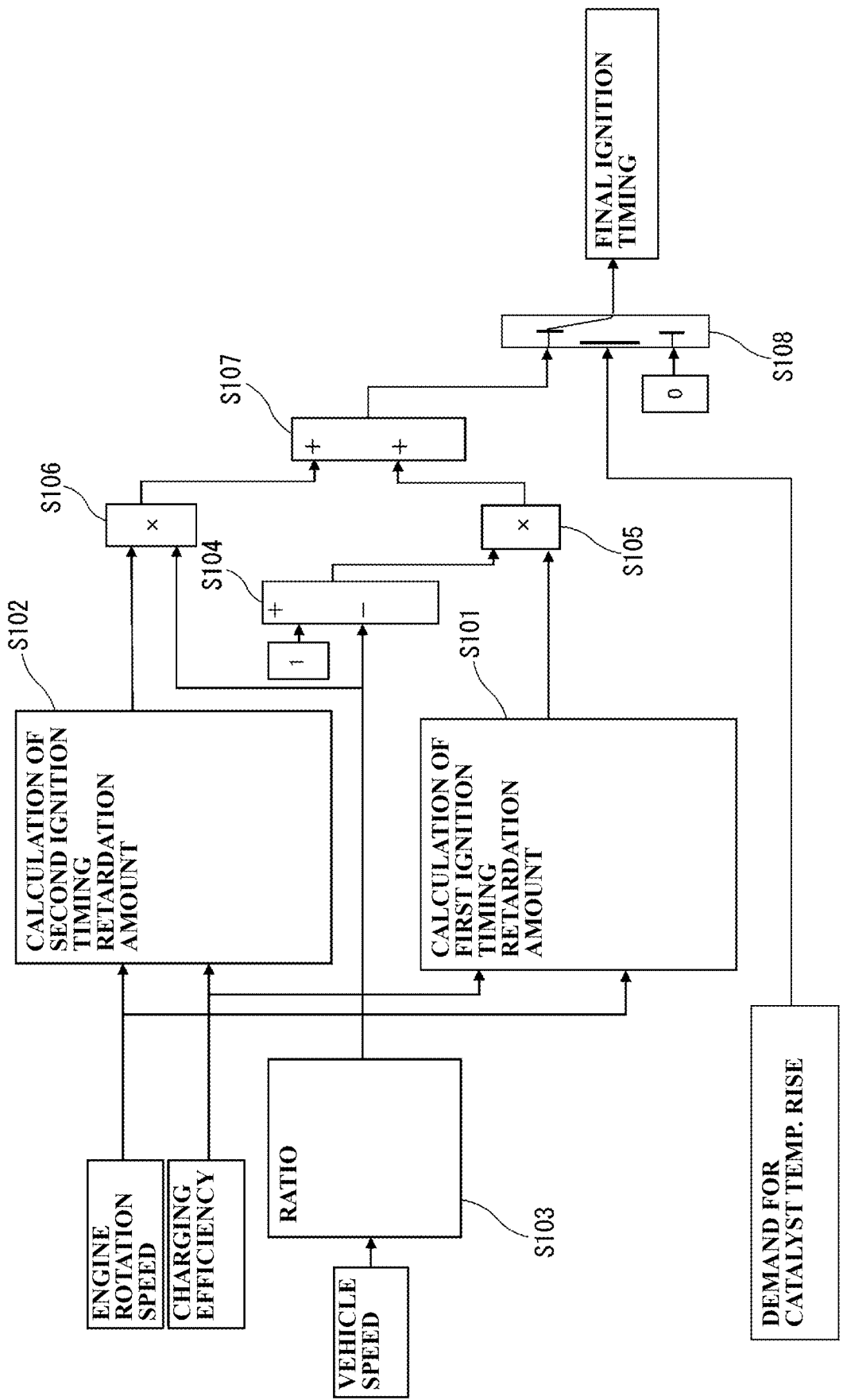
FIG. 7 is a block diagram of the process for catalyst temperature rise control in the hybrid vehicle.

FIG. 7 is a block diagram of the process for the catalyst temperature rise control of the hybrid vehicle according to the present embodiment.

Step S101 is a first ignition timing retardation amount calculation part that calculates the first ignition timing retardation amount based on the engine rotation speed and charging efficiency of the internal combustion engine 7. Step S102 is a second ignition timing retardation amount calculation part that calculates the second ignition timing retardation amount based on the engine rotation speed and charging efficiency of the internal combustion engine 7. Step S103 is a ratio calculation part that calculates the second ratio according to the vehicle speed. Step S104 is a first ratio calculation part that calculates the first ratio by subtracting the second ratio from "1". Step S105 is a first calculation part that calculates the stop-state corresponding retardation amount by multiplying the first ignition timing retardation amount by the first ratio. Step S106 is a second calculation part that calculates the running-state corresponding retardation amount by multiplying the second ignition timing retardation amount by the second ratio. Step S107 is a catalyst temperature rise control retardation amount calculation part that calculates the retardation amount of the ignition timing of the internal combustion engine 7 under the catalyst temperature rise control as the catalyst temperature rise control retardation amount by summing the stop-state corresponding retardation amount and the running-state corresponding retardation amount. Step S108 is a final ignition timing determination part that determines whether to retard the ignition timing according to the presence or absence of the catalyst temperature rise demand. In the absence of the catalyst temperature rise demand, the retardation amount of the ignition timing is set to "0" at step S108. In the presence of the catalyst temperature rise demand, the retardation amount of the ignition timing is set to the catalyst temperature rise control retardation amount at step S108.

As described above, the hybrid vehicle according to the present embodiment is configured to, when the ignition timing is retarded for warm-up of the catalyst, set the retardation amount of the ignition timing larger in the state where the hybrid vehicle experiences large vibration than the retardation amount of the ignition timing in the stop state of the hybrid vehicle. This control achieves (accomplishes) warm-up of the catalyst as early as possible without causing driver's discomfort.

In particular, vibration of the internal combustion engine 7 is more acceptable during running of the hybrid vehicle than during stopping of the hybrid vehicle. It is thus possible to, when the ignition timing is retarded for warm-up of the catalyst, achieve warm-up of the catalyst as early as possible without causing driver's discomfort by setting the retardation amount of the ignition amount in the running state of the hybrid vehicle larger than that in the stop state of the hybrid vehicle.

The higher the vehicle speed, the larger the vibrations of the hybrid vehicle during running. It is thus possible to, even when the retardation amount of the ignition timing is increased with increase of the vehicle speed under the catalyst temperature rise control, cancel (suppress) the influence of such control on the vehicle vibrations.

Although the present invention has been described by way of the above specific example, the present invention is not limited to the above-described specific embodiment. Various changes and modifications of the above-described specific embodiment are possible within the range that does not depart from the scope of the present invention.

For example, the retardation amount of the ignition timing under the catalyst temperature rise control may be increased as the road noise during running of the hybrid vehicle becomes larger. In other words, even at the same vehicle speed under the catalyst temperature rise control, the ignition timing retardation amount may be set larger as the road noise becomes larger. The road noise can be detected with the use of any road noise detecting sensor. Alternatively, it is feasible to judge that the road noise is large when the angular speed change of the crankshaft detected by the crank angle sensor 42 is large.

Further, the retardation amount of the ignition timing under the catalyst temperature rise control may be increased during running of the hybrid vehicle in rainy weather. In other words, even at the same vehicle speed under the catalyst temperature rise control, the ignition timing retardation amount may be set larger during running of the hybrid vehicle in rainy weather than during running of the hybrid vehicle in fine weather. It is feasible to judge whether or not the hybrid vehicle is running in rainy weather with the use of a signal of a sensor that detects raindrops adhered to an windshield wiper etc. of the hybrid vehicle.

The catalyst temperature rise control may be performed in such a manner that both of the catalyst of the first exhaust catalyst device 24 and the catalyst of the second exhaust catalyst device 25 reach their respective activation temperatures. The catalyst temperature of the second exhaust catalyst device 25 can be determined based on the detection value of the second exhaust temperature sensor 45. Alternatively, the catalyst temperature of the second exhaust catalyst device 25 may be directly detected by a temperature sensor.

The above-described embodiment pertains to a control method for a hybrid vehicle and a control device for a hybrid vehicle.

The invention claimed is:
1. A control method for a hybrid vehicle, the hybrid vehicle comprising:
a first motor capable of generating and supplying power to a battery;
a second motor that drives driving wheels of the hybrid vehicle with power supplied from the battery or power generated by the first motor;
an internal combustion engine that drives the first motor; and
a catalyst for exhaust gas purification arranged in an exhaust passage of the internal combustion engine,
the hybrid vehicle being so configured that drive power of the internal combustion engine is not mechanically transmitted to the driving wheels,
the control method comprising performing catalyst temperature rise control to retard an ignition timing of the internal combustion engine when a temperature of the catalyst is lower than or equal to a predetermined temperature level,
wherein, in the catalyst temperature rise control, a retardation amount of the ignition timing in a state where the hybrid vehicle experiences more vibration than in a stop state of the hybrid vehicle is set larger than that in the stop state of the hybrid vehicle.

2. The control method for the hybrid vehicle according to claim 1,
wherein the state where the hybrid vehicle experiences more vibration than in the stop state of the hybrid vehicle is a running state of the hybrid vehicle.

3. The control method for the hybrid vehicle according to claim 2,
wherein, in the catalyst temperature rise control, the retardation amount of the ignition timing is set larger as a running speed of the hybrid vehicle becomes higher.

4. The control method for the hybrid vehicle according to claim 2,
wherein, in the catalyst temperature rise control, the ignition timing is determined using a first ignition timing retardation amount calculation map for calculating the retardation amount of the ignition timing in the stop state of the hybrid vehicle, a second ignition timing retardation amount calculation map for calculating the retardation amount of the ignition timing retardation in the running state of the hybrid vehicle, and a ratio set according to the running speed of the hybrid vehicle.

5. A control device for a hybrid vehicle, the hybrid vehicle comprising:
a first motor capable of generating and supplying power to a battery;
a second motor that drives driving wheels of the hybrid vehicle with power supplied from the battery or power generated by the first motor;
an internal combustion engine that drives the first motor; and
a catalyst for exhaust gas purification arranged in an exhaust passage of the internal combustion engine;
the hybrid vehicle being so configured that drive power of the internal combustion engine is not mechanically transmitted to the driving wheels,
the control device comprising a controller that retards an ignition timing of the internal combustion engine when a temperature of the catalyst is lower than or equal to a predetermined temperature level,
wherein the controller sets an retardation amount of the ignition timing in a state where the hybrid vehicle experiences more vibration than in a stop state of the hybrid vehicle larger than that in the stop state of the hybrid vehicle.

* * * * *